(12) United States Patent
Stuhlmann

(10) Patent No.: US 9,573,712 B2
(45) Date of Patent: Feb. 21, 2017

(54) DEVICE FOR THE CREATION OF PACKAGED UNITS

(71) Applicant: KHS GmbH, Dortmund (DE)

(72) Inventor: Christoph Stuhlmann, Korbach (DE)

(73) Assignee: KHS GmbH, Dortmund (DE)

( * ) Notice: Subject to any disclaimer, the term of this patent is extended or adjusted under 35 U.S.C. 154(b) by 205 days.

(21) Appl. No.: 14/385,858

(22) PCT Filed: Mar. 21, 2013

(86) PCT No.: PCT/EP2013/000853
§ 371 (c)(1),
(2) Date: Sep. 17, 2014

(87) PCT Pub. No.: WO2013/143667
PCT Pub. Date: Oct. 3, 2013

(65) Prior Publication Data
US 2015/0034252 A1 Feb. 5, 2015

(30) Foreign Application Priority Data
Mar. 26, 2012 (DE) .......................... 10 2012 005 927

(51) Int. Cl.
*B65G 47/00* (2006.01)
*B65B 17/02* (2006.01)
(Continued)

(52) U.S. Cl.
CPC ........... *B65B 17/02* (2013.01); *B32B 37/0046* (2013.01); *B32B 37/12* (2013.01); *B32B 38/1833* (2013.01);
(Continued)

(58) Field of Classification Search
CPC ........ B65B 17/02; B65B 17/025; B65B 21/06; B65B 21/20; B65B 21/183; B65B 21/18; B65B 27/04; B65B 35/14; B65B 35/16; B65B 35/36; Y10T 156/1744; Y10T 156/1751; B65G 47/08; B65G 47/088
(Continued)

(56) References Cited

U.S. PATENT DOCUMENTS 3,209,923 A * 10/1965 Bargel .................... B65B 21/20
198/418
3,753,509 A * 8/1973 Kock ...................... B65B 21/18
198/404
(Continued)

FOREIGN PATENT DOCUMENTS

DE 2331193 1/1975
DE 3538119 A1 * 4/1987 ............. B65B 17/02
(Continued)

OTHER PUBLICATIONS

Machine translation of DE 3538119 date unknown.*

*Primary Examiner* — John Goff
(74) *Attorney, Agent, or Firm* — Occhiuti & Rohlicek LLP

(57) ABSTRACT

An apparatus for receiving, from a wide container stream upstream from the apparatus, single-lane container streams and creating package units of containers includes a separating and/or combining unit, application elements, and a linear transporter. The unit separates and/or combines containers to form partial packaged units that are then combined into a package unit. The application elements are disposed so that at least one container of a package unit has, on a contact surface thereof, adhesive or glue. The linear transporter comprises transport elements circulate along a guide element, and a controllable drive. Each transport element of the linear transporter comprises as many head guides as there are containers in the package unit, each of which is axially movable or rotatable relative to the transport element.

16 Claims, 1 Drawing Sheet

(51) Int. Cl.
*B65G 47/08* (2006.01)
*B32B 37/00* (2006.01)
*B32B 37/12* (2006.01)
*B32B 38/18* (2006.01)
*B32B 41/00* (2006.01)
*B65B 27/04* (2006.01)
*B65B 21/06* (2006.01)

(52) U.S. Cl.
CPC ............... *B32B 41/00* (2013.01); *B65B 27/04* (2013.01); *B65G 47/08* (2013.01); *B65G 47/088* (2013.01); *B32B 2041/04* (2013.01); *B32B 2398/00* (2013.01); *B32B 2439/60* (2013.01); *B32B 2439/66* (2013.01); *B65B 21/06* (2013.01); *B65G 2201/0247* (2013.01); *Y10T 156/1744* (2015.01); *Y10T 156/1768* (2015.01)

(58) Field of Classification Search
USPC ...... 53/48.1, 543, 247, 531, 443; 198/419.3, 198/426
See application file for complete search history.

(56) References Cited

U.S. PATENT DOCUMENTS

| | | | | |
|---|---|---|---|---|
| 3,783,587 | A * | 1/1974 | Kurtenbach | B65B 21/183 53/247 |
| 4,251,979 | A * | 2/1981 | Horigome | B65B 21/04 53/247 |
| 5,487,257 | A * | 1/1996 | Domeier | B65B 21/183 414/416.06 |
| 5,797,249 | A | 8/1998 | Hartness | |
| 7,726,464 | B2 | 6/2010 | Cerf | |
| 2010/0308043 | A1* | 12/2010 | Wimmer | B65B 17/02 220/23.4 |

FOREIGN PATENT DOCUMENTS

| | | |
|---|---|---|
| DE | 4126212 | 2/1993 |
| DE | 10 2006 037105 | 2/2008 |
| DE | 10 2009 025824 | 11/2010 |
| DE | 10 2009 025912 | 12/2010 |
| DE | 10 2009 044271 | 4/2011 |
| EP | 2096039 | 9/2009 |
| EP | 2258625 | 12/2010 |

* cited by examiner

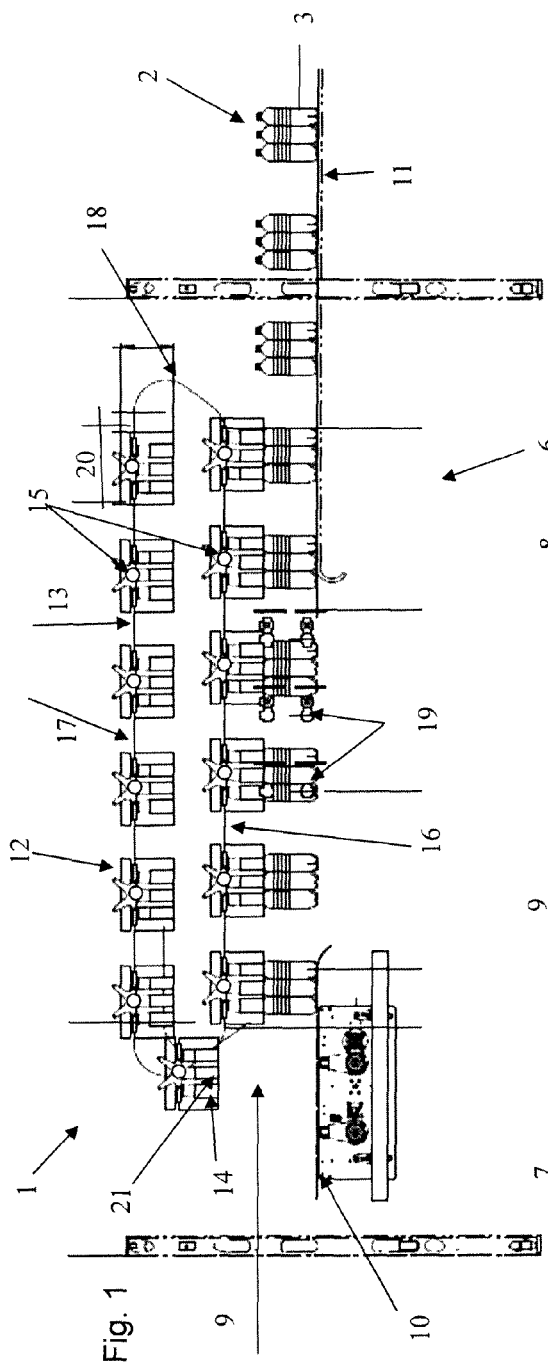
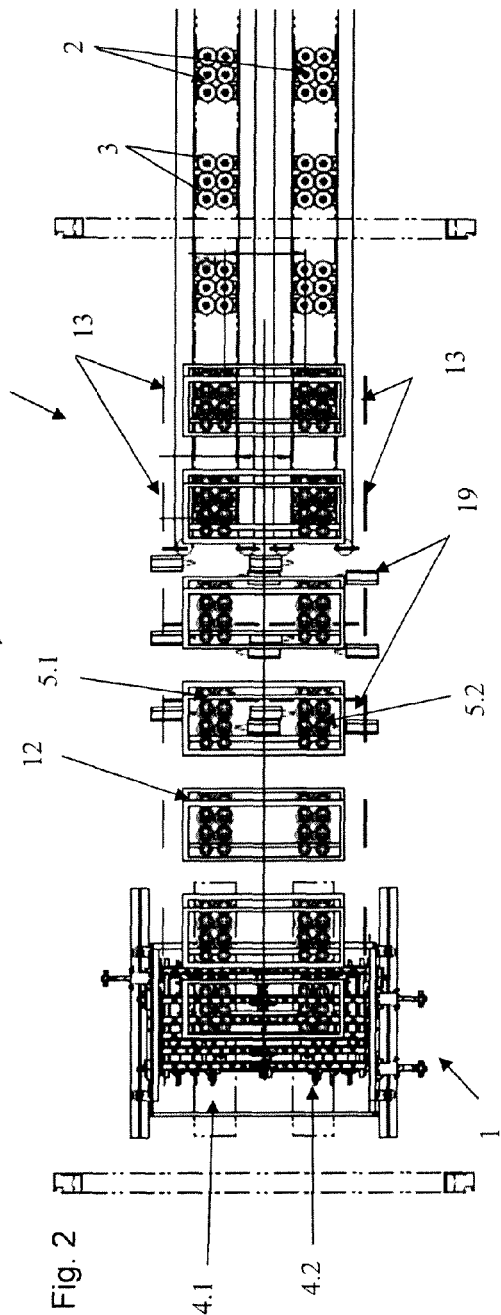
Fig. 1
Fig. 2

DEVICE FOR THE CREATION OF PACKAGED UNITS

RELATED APPLICATIONS

This application is the national stage under §371 of PCT/EP2013/000853, filed on Mar. 21, 2013, which claims the benefit of the Mar. 26, 2012 priority date of DE 10 2012 005 927.2, the contents of which are herein incorporated by reference.

FIELD OF INVENTION

The invention relates to container packaging, and in particular, to creating package units of containers.

BACKGROUND

It is known to combine or form several articles into an article group and to then create firm, transportable storage and transport units or packaged units from the article groups using shrink film. A disadvantage of using shrink films is that shrinking of the films by heat or energy application incurs not insignificant costs.

It has already been proposed to create transportable packaged units by wrapping the containers into a container group using a wrapping that surrounds or loops around the container group. The wrapping can also be glued to the containers.

The disadvantage of using a wrapping, however, is that, on first removal of a container from such a packaged unit, the containers remaining in the unit are no longer held together by the wrapping. This applies not only when the wrapping is torn or cut, but also in those cases in which one removes a container from the packaged unit without tearing the wrapping.

Furthermore, on transport of such packaged units on a conveyor belt, there is always the risk that cylindrical or largely cylindrical articles, such as cans, bottles, or containers, will assume a nested position due to vibration, impact etc. In a nested position, the cylindrical article slips into gaps in an adjacent row. To prevent this, considerable tension must be applied to the wrapping.

Another known method relies on a rotary star provided on both sides of the track. The rotary star presses the bottle necks into clamps on bottle carriers. Inn this method, the bottle pack is still surrounded with a strap or wrapping, or film.

It is also know to apply adhesive to containers in narrow areas or strips. The containers adhere to each other at these areas or strips. Meanwhile, adjacent surfaces not provided with adhesive can be used to grip and carry the pack.

SUMMARY

The object of the invention is to provide a device and method for the creation of packaged units of the type cited initially, in which, despite the absence of the surrounding film, and/or despite the absence of a wrapping, the articles are always easily prevented from assuming a nested position on transport, wherein also after removal of one or more articles from the packaged unit, the position of the remaining articles in the packaged unit can be retained or restored.

Achieving this object involves use of a linear transporter that has transport elements, each of which has a controllable drive and circulates along a guide element. The transport elements have a number of head guides corresponding to the number of containers of the later packaged unit. These guides are axially movable and/or rotatable relative to the transport element.

In detail, the packaged unit is created e.g. such that the containers are supplied standing upright on a transport surface of a conveyor and with their container axes oriented in the vertical or substantially vertical direction, in a mass transport or wide container stream in which the containers have an arbitrary orientation with regard to identifier containers and/or design features. This wide container stream is then converted by lane division into several single-lane container streams. In further process steps, the containers forming the later packaged unit or the container groups are separated out of the single-lane container streams, the necessary number of containers are combined into a compact container group in which the containers lie against each other with several casing or peripheral surfaces, i.e. with contact surfaces, and the containers of each container group are joined into a compact and fixed or stable packaged unit.

Containers in the sense of the invention are for example bottles, cans, tubes, pouches, made of metal, glass and/or plastic, i.e. for example also PET bottles, ther packaging means, in particular those suitable for filling with liquid or viscous products, and containers that have already been combined into groups (multipack). Such containers, e.g. PET bottles, have a contact region that is spherically curved so that the containers can roll against each other along a peripheral track, i.e. at a "rolling ring". In glass bottles, on multiple use of the bottle, this rolling ring is detectable, for example, by a usually bright marking of a detectable wear ring. Such a "rolling ring" can be arranged not only in the head region but also in the foot region of PET bottles.

Containers in the sense of the invention also include PET bottles, bottles, cans, tubes, pouches, in each case made of metal, glass and/or plastic, as well as other packaging means, in particular those that are suitable for filling with fluid or viscous products, but also containers which are already combined into groups (multipack). The containers of the packaged unit are arranged in non-nested positions.

As used herein, "adhesive or glue" includes all materials or compounds with which an adhesive connection between containers is possible, in particular connections, materials or compounds that, when applied in liquid or viscous state, form a self-adhesive layer and/or achieve an adhesive connection under application of pressure and/or under the supply of energy and/or after hardening or cross-linking (also by energy application). As used herein, "adhesive or glue" includes laminated materials, e.g. those made of at least one carrier material coated with a material with which an adhesive connection can be created between containers, i.e. which have an adhesive and/or gluing action on at least two sides. Such adhesives or glues may be known as pads.

As used herein, an "adhesive" container comprises adhesive or glue, or is provided with an application of adhesive or glue. The adhesive or glue is preferably selected such that the containers can be separated from each other or removed from the packaged unit easily and without damage. It is conceivable that liquid adhesive is applied by the application elements. It is also possible for a low-viscosity, UV-hardening adhesive to be applied. A hot glue would also be suitable, but hot glue cools very rapidly and could lose its adhesive properties before the containers are glued together sufficiently firmly into the packaged unit. A UV-hardening adhesive is also advantageous because it is particularly simple to set its desired properties. A corresponding hardening station or hardening section is suitably arranged to be stationary downstream of the application elements, or along the linear transporter, or either above or below it. A hardening station can, for example, be a tunnel with UV illumination.

It is suitable if the transport elements are slides, which may also be called "carrying frames." The transport elements, or slides, comprise the controllable drive. Each drive is controllable separately by a corresponding control unit. As a result, each transport element can have a transport speed that is adapted to its particular requirements.

With the controllable drive, the transport element is in contact with the guide element. The guide element can also be a guide rail along which the transport element is moved by the controllable drive. The guide element has an advance strand and a return strand with reversing sections arranged in between. The guide element itself does not have a conveyor speed. Only the transport elements are moved, by the controllable drive, relative to the guide element. Preferably, the return strand is arranged above the advance strand.

With the head guides, the containers held on the transport element are transported from the input side, past the application elements, to the output side. On the input side, the containers are received from an input conveyor. On the output side, the containers, which have been provided with the glue and adhesive, are transferred to an output conveyor. The input and output conveyors can be belt conveyors.

In one preferred embodiment, each transport element or slide is held at a guide element at its respective short side arranged along the transport direction. The transverse sides, which are arranged perpendicular to the short sides, extend transverse to the transport direction between guide elements so that the carrier frame or slide is guided securely and stably.

In some embodiments, the controllable drive is arranged at only one of the two short sides. In such a case, a corresponding roller element driven by the drive opposite can be arranged on the other short side. Naturally controllable drives can be arranged on both short sides, in which case they must be synchronized. The controllable drive can, for example, include a servomotor.

In some embodiments, the transport element has a controllable drive that is controllable separately by the control unit. As a result, the transport element can have different speeds along its transport path. In particular those transport elements that have reached the return strand can have a higher speed than those transport elements that are still moving along the advance strand. This means that the overall number of transport elements in the system can advantageously be reduced in comparison with systems in which transport elements lack speed control. This reduction in the required number of transport elements arises because along the return strand an initially higher speed can be set so that transport elements can be in a waiting position in the region of the return strand end. Along the transport path of the advance strand, the transport elements preferably all move with the same speeds.

Since the containers are held at the head guides, the transport elements can transport the containers along the transport path of the advance strand while they are freely suspended. The head guides can have packing or centering sleeves for holding the containers at their mouths.

In a preferred embodiment, the head guides are movable relative to the transport element, i.e. relative to the carrier frame or slide. Thus, for example, a targeted orientation of the containers according to design features, existing labels or similar features can be carried out, so that the containers are oriented in the same direction to each other within the later packaged unit. To achieve this targeted orientation, only the head guides need to be controlled accordingly. It is also suitable, in some embodiments, for each head guide to be controllable separately i.e. independently of the others. The control signals or control movements can be triggered by the head guide's corresponding control unit, or also by the central control unit.

A corresponding inspection device could also be provided to detect the actual position of the containers from the features to be examined, for example from the label position, to carry out a corresponding comparison with stored nominal positions, and to then generate corresponding signals.

In some embodiments, a head guide is both rotatable about their axis and also axially movable. The degrees of freedom provided allow a superposition of the different position changes necessary, so that each container can be oriented in harmony with the other containers in a desired nominal position. The ability to freely suspend containers while transporting them avoids friction resistances acting on the base.

In a preferred embodiment, the application elements or application stations are arranged, when viewed in the transport direction, upstream of the delivery of the containers to the output conveyor. The application elements provide the containers with glue or adhesive. By means of the axial movement capacity of the containers via the head guides, the containers can be moved against each other while optionally oriented in relation to each other, so that already a degree of contact pressure can be generated that promotes a mutual adhesive or glue connection of the containers.

In a preferred embodiment, several application elements or application stations can be provided in succession along the transport direction, which takes into account the optional rotation of the container held at the respective packaging or centering sleeve. Thanks to the rotation of the containers along the transport direction, contact surfaces provided with adhesive or glue which are offset viewed in the peripheral direction of the containers. This promotes an adhesive connection since in this way virtually every container can then assume an adhesive connection with the directly adjacent containers on at least two contact surfaces.

The packaged unit can be formed from six containers. The head guides, as already indicated above, can exert a force transverse to and along the transport direction so that the a force causes respective containers of a packaged unit to be pressed against each other. This promotes adhesive connection. To achieve such an effect, the head guides are brought closer together to increase the active pressure force.

It is advantageous if several later packaged units, i.e. two packaged units, each of six containers, each with a transport element, can be processed as described above. So on the input side, two separate input streams are provided and on the output side, there are two separate output streams.

If a UV-hardening adhesive is applied, a hardening station or section can be provided. The hardening station can be arranged above or below the transport surfaces. A tunnel with UV illumination can also be used as a hardening station can be used. Carrier elements can also be provided on the output conveyor to support the transport of the complete packaged unit towards the output side.

When viewed in the transport direction, a packaged unit can have several rows. For example, in some embodiments, packaged units have two rows. In others, packaged units have three rows.

It is also possible for the application elements or stations to be arranged not only rigidly at the linear transporter, but also movably so that the application elements can be carried with a respective container stream at least along a part section.

In some embodiments, the packaging unit is configured to fir a packaged units with a carrier element, such as a handle. Suitable devices can be provided downstream of the output side or at a suitable point on the linear transporter. The carrier element can be attached to the packaged unit in a variety of ways, including with the adhesive or glue.

The invention therefore provides a device for creation of a packaged unit that, despite the omission of a surrounding film and/or despite the omission of wrapping, easily prevents the containers from assuming a nested position during transport. After removal of one or more containers from the packaged unit, the position of the remaining containers in the packaged unit is retained or can be restored.

The omission of a film or a wrapper strip to make a filmless bottle pack or container pact promotes environmental protection by avoiding waste, and also saves resources that would otherwise by used to produce the predominantly plastic films. During transport i.e. in continuous operation of the device for creation of packaged units or the packaging machine, the containers of a packaged unit are glued directly to each other. A filmless container pack with adequate mutual connection between individual containers is thus achievable with only a minimal application of adhesive.

Extremely high output rates can be also achieved with the invention. These high speeds arise in part as a result of the the arbitrarily controllable velocity and acceleration of the transport elements.

In one aspect, the invention features an apparatus for receiving, from a wide container stream upstream from the apparatus, single-lane container streams of containers and creating package units of those containers. Such an apparatus comprises a unit, application elements, and a linear transporter. The unit, which either separates a predefined number of containers to form partial packaged units that are then combined into a package unit or combines a predefined number of containers to form partial packaged units that are then combined into a package unit, is either a separation unit, a combining unit, or a separating-and-combining unit. The application elements are disposed so that at least one container of a package unit has, on a contact surface thereof, either adhesive, glue, an application of adhesive, an application of glue, a combination of adhesive and glue, or an application of a combination of adhesive and glue. The linear transporter comprises transport elements, and a controllable drive. These transport elements along a guide element. Each one has as many head guides as there are containers in the package unit, and a controllable drive. Each head guide is either axially movable relative to the transport element, rotatable relative to the transport element, or both.

Embodiments include those in which each transport element includes a slide that comprises the controllable drive and those embodiments in which each transport element comprises a carrier frame that comprises the controllable drive.

In certain embodiments, each drive of each transport element is controllable separately and independently of other drives of the transport element. Among these are embodiments in which each of the transport elements comprises at least one of a slide and a carrier frame, either of which comprises the controllable drive.

In some embodiments, the guide element comprises an advance strand, a return strand, and a reversing section. In these embodiments, the reversing section is arranged between the advance strand and the return strand.

In other embodiments, each of the transport elements comprises a short side. In these embodiments, the guide element guides the transport element on the short side.

Yet other embodiments include a part section along which the containers are suspended and freely transported.

Also among the embodiments are those in which the head guides are controllable independently of each other.

In yet other embodiments, the transport element is configured such that several package units can be transported therewith.

Refinements, advantages and possible applications of the invention arise from the following description of exemplary embodiment and from the figures. The content of the claims is also declared a constituent part of the description.

BRIEF DESCRIPTION OF THE DRAWINGS

The invention is explained in more detail below with reference to an embodiment example shown in the figures. In the drawings:

FIG. 1 shows a partial section of a device for the creation of a packaged unit with six articles or containers, in a side view, and FIG. 2 shows the part section from FIG. 1 in top view.

In the different figures, parts having the same reference numerals are the same and therefore are only described once.

DETAILED DESCRIPTION

FIG. 1 shows a partial section of a packaging machine 1 for the creation of packaged units 2 of containers 3. The packaging machine 1 receives containers from a wide container stream in which containers 3 are divided into several two-lane container streams 4.1 and 4.2 and in which the containers 3 are arbitrarily orientated relative to their container and/or design features.

The illustrated packaging machine 1 separates and combines a predefined number of containers 3, for example six containers 3 for forming a "sixpack." These containers are then formed into compacted or shaped container groups 5.1, 5.2, or partial packaged units 5.1, 5.2 that are then combined into a packaged unit 2. At least one of the containers 3 of the packaged unit 2, and preferably each container 3, has an adhesive or glue and/or an application of an adhesive and/or glue on at least one contact surface.

FIG. 1 also shows a linear transporter 6 that transports the containers 3 from an input side 7 towards an output side 8 along a transport direction 9. Input and output conveyors 10, 11 are provided at the the input side 7 and the output side 8 respectively.

The linear transporter 6 has transport elements 12 that circulate along a guide element 13. The transport elements 12 are formed as slides or carrier frames. Each transport element 12 comprises a controllable drive 15, which can be a servomotor, and a number of head guides 14. The number of head guides 14 corresponds to the number of containers 3 of the later packaged unit 2. The head guides 14 are axially movable and/or rotatable relative to the transport element 12.

The transport element 12 is in contact with the guide element 13. The controllable drive 15 moves the transport element 12 along this guide element 13. In one embodiment, the guide element 13 is a guide rail.

The guide element 13 has an advance strand 16 and a return strand 17 with reversing sections 18 arranged between them. The return strand 17 is preferably arranged above the advance strand 16. As shown in FIG. 2, each side of the linear transporter 6 has a guide element 13 between which the transport elements 12 are movably mounted. Each transport element 12 or slide, on its short side 20 arranged along the transport direction 9, is held at a guide element 13.

With the head guides 14, the containers 3 held on the transport element 12 are transported from the input side 7, past the application elements 19 for application of adhesive or glue, to the output side 8. On the input side 7, the containers 3 are received from an input conveyor 10. On the output side 8, the containers 3 are delivered to an output conveyor 11. The input and output conveyors 10, 11 can be belt conveyors.

The controllable drive 15 can be controlled separately by a control unit. As a result, each transport element 12 can assume different speeds along its transport path. In particular the transport elements 12 that have reached the return strand 17 can move faster than the transport elements 12 that are still moving along the advance strand 16. In particular along the return strand 17, for example an initially higher speed of the transport elements 12 can be set so that the transport elements 12 can be in a waiting position in the region of the return strand's end. Along the transport path of the advance strand 16 however, the respective transport elements 12 preferably have the same speed as each other.

It is evident that the containers 3 are transported freely suspended along the transport path of the advance strand 16, since the containers are held at the head guides 14. To promote this, it is preferable that the head guides 14 be rotatable about their vertical axes and also axially movable along transverse or linear axes so that the containers 3 can be freely suspended during transport thereof.

The head guides 14 can have packing or centering sleeves 21 for holding the containers 3 at their mouths. For example, the head guides 14 are movable relative to the transport elements 12, i.e. relative to the carrier frame or slide. Thus, for example, a targeted orientation of the containers 3 according to design features, existing labels or similar features can be achieved, so that the containers are oriented in the same way as each other within the later packaged unit 2. For this, only the head guides 14 need to be controlled. It is also suitable if each head guide 14 is controllable separately i.e. independently of the others.

A corresponding control unit, or in the alternative, a central control unit, triggers control signals or control movements. To achieve this, a corresponding inspection device can be provided. Such an inspection device detects the actual positions of the containers, compares these detected positions with stored nominal positions, and then generates corresponding signals.

In a preferred embodiment, the application elements 19 are arranged upstream of the output conveyor 11. The application elements 19 apply glue or adhesive to the container 3. The head guides 14, through their ability to axially move the containers, can move the containers 3 against each other while optionally orienting them in relation to each other to achieve a specified contact pressure. This promotes adhesive bonding between containers 3.

As shown in the figures, several application elements 19 or application stations can be provided in succession along the transport direction 9.

Having described the invention, and a preferred embodiment thereof, what is claimed as new and secured by Letters Patent is:

1. An apparatus for receiving, from a wide container stream upstream from the apparatus, single-lane container streams of containers and creating package units of said containers, said apparatus comprising a unit, application elements, a first transport-element, a second transport-element, a first controllable-drive, a second controllable-drive, a first set of head guides, a second set of head guides, and a linear transporter, wherein said unit carries out at least one act selected from the group consisting of separating a predefined number of containers to form partial packaged units that are then combined into a package unit and combining a predefined number of containers to form partial packaged units that are then combined into a package unit, wherein said unit is selected from the group consisting of a separation unit, a combining unit, and a separating-and-combining unit, wherein said application elements are disposed so that at least one container of a package unit has, on a contact surface thereof, an application of adhesive, an application of glue, or an application of a combination of adhesive and glue, wherein said first controllable-drive causes said first-transport element to circulate along a guide element at a first speed, wherein said second controllable drive causes said second transport-element to circulate along said guide element at a second speed, wherein said first and second speeds are controllable independently of each other, wherein said first set of head guides is coupled to said first transport-element, wherein said second set of head guides is coupled to said second transport-element, wherein said package unit consists of a first number of containers, wherein said first set of head guides comprises a first number of head guides, wherein said second set of head guides comprises a second number of head guides, and wherein said first set of head guides comprise first and second head-guides that are movable relative to said first transport-element, and wherein said second set of head guides comprises first and second head-guides that are movable relative to said second transport-element.

2. The apparatus of claim 1, wherein said first transport-element comprises a first slide, wherein said first slide comprises said first controllable-drive, wherein said second transport-element comprises a second slide, and wherein said second slide comprises said second controllable-drive.

3. The apparatus of claim 1, wherein said first transport-element comprises a first carrier-frame, wherein said first carrier-frame comprises said first controllable-drive, wherein said second transport-element comprises a second carrier-frame, and wherein said second carrier-frame comprises said second controllable-drive.

4. The apparatus of claim 1, wherein said first controllable-drive is controllable separately and independently of said second controllable-drive.

5. The apparatus of claim 1, wherein said guide element comprises an advance strand, a return strand, and a reversing section, wherein said reversing section is arranged between said advance strand and said return strand.

6. The apparatus of claim 1, wherein said first transport-element comprises a first side having a first length and a second side having a second length, wherein said guide element guides said first transport-element on said first side, and wherein said first length is less than said second length.

7. The apparatus claim 1, further comprising a part section along which said containers are suspended and freely transported.

8. The apparatus of claim 1, wherein movement of said first head-guide of said first set of head guides relative to said first transport-element is controllable independently of movement of said second head-guide of said first set of head guides relative to said first transport-element.

9. The apparatus of claim 5, wherein said first controllable-drive is configured to control a speed of said first transport-element along said guide element, and wherein said second controllable-drive is configured to control a speed of said second transport-element along said guide element.

10. The apparatus of claim 5, wherein said first controllable-drive is configured to cause said first transport-element to move along said advance strand at a first speed, and to move along said return strand at a second speed, wherein said second speed exceeds said first speed.

11. The apparatus of claim 1, wherein said first and second head-guides of said first set of head guides are axially movable relative to said first transport-element, and wherein said first and second head-guides of said second set of head guides are axially movable relative to said second transport-element.

12. The apparatus of claim 1, wherein said first and second head-guides of said first set of head guides are rotatable relative to said first transport-element, and wherein said first and second head-guides of said second set of head guides are rotatable relative to said second transport-element.

13. The apparatus of claim 1, further comprising a central control-unit that controls said first and second controllable-drives.

14. The apparatus of claim 1, further comprising a first control-unit and a second control-unit, wherein said first control-unit controls said first controllable-drive and a second control-unit controls said second controllable-drive.

15. The apparatus of claim 1, further comprising an inspection device that detects positions of containers, compares said detected positions with nominal positions, and generates, based at least in part on said comparison, signals for controlling said first controllable-drive.

16. The apparatus of claim 1, wherein said first controllable-drive is configured to cause said first transport-element to move at different speeds along different sections of said guide element and wherein said second controllable-drive is configured to cause said second transport-element to move at different speeds along different sections of said guide element.

* * * * *